May 16, 1939.  R. A. KALTWASSER  2,158,873
POWER TRANSMITTING MECHANISM
Filed Oct. 6, 1937
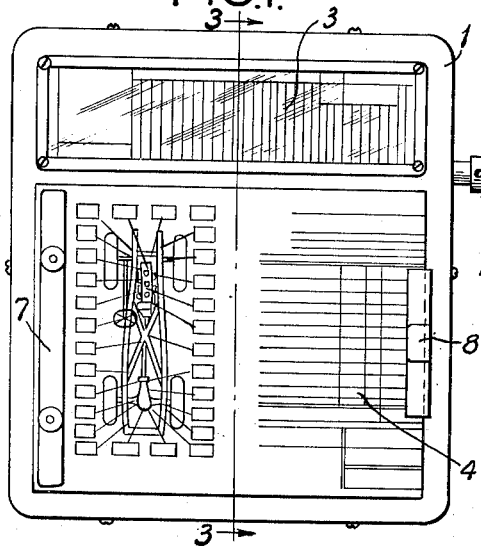
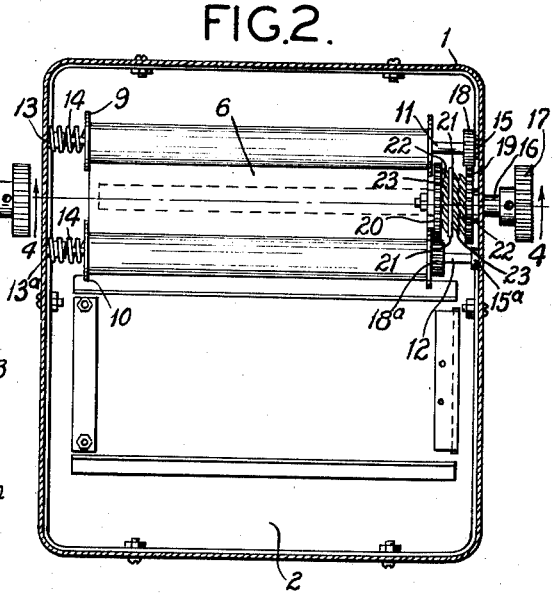
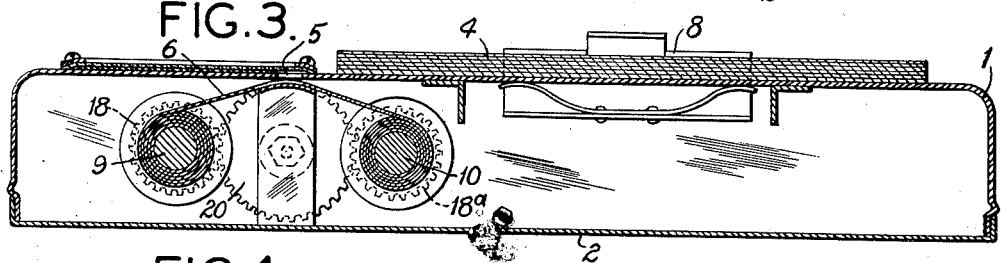
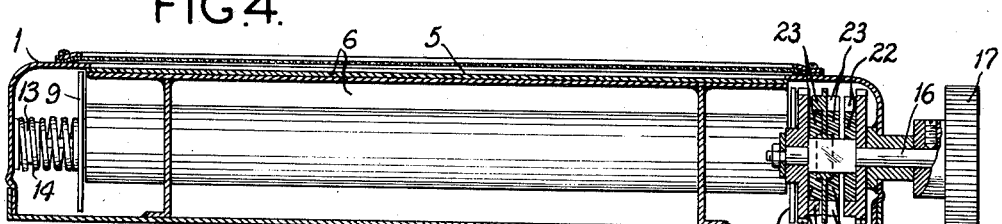
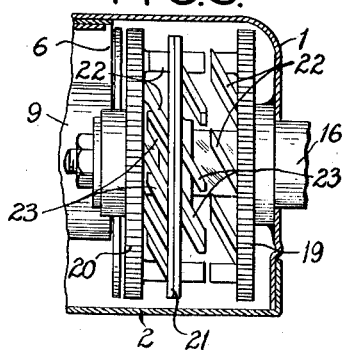
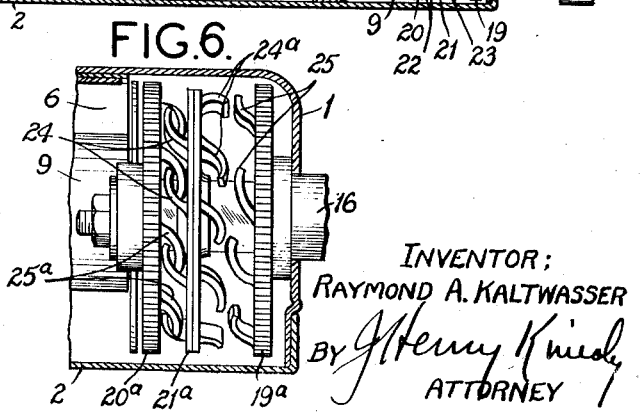
INVENTOR;
RAYMOND A. KALTWASSER
By *J. Henry Kniedy*
ATTORNEY Patented May 16, 1939

2,158,873

UNITED STATES PATENT OFFICE 2,158,873

POWER TRANSMITTING MECHANISM

Raymond A. Kaltwasser, Clayton, Mo.

Application October 6, 1937, Serial No. 167,483

6 Claims. (Cl. 192—51)

My invention relates to power transmitting mechanisms and more particularly to power transmitting mechanism including an automatically operated clutch whereby a pair of driven parts may be each selectively rotated by a single driving member independently of the rotation of the other driven part. In other words, rotation of the driving member in one direction will rotate one of the pair of driven parts and the second driven part will be free to rotate and rotation of the driving member in the other direction will rotate the second driven part and allow the first part to be free.

Heretofore, there have been many attempts to make a power transmitting mechanism of this type, but such attempts have failed because the mechanism would not operate positively and because the clutch members included therein would break in use.

Therefore, having in mind the deficiencies of the structures heretofore used, the objects of my invention are to provide a power transmitting mechanism of the class described which will operate effectively, accurately and efficaciously and to provide a power transmitting mechanism which will be simple in design and cheap in manufacture.

It should be understood that a power transmitting mechanism embodying my invention may be put to many uses, but I have found it particularly adapted for use in simple devices where the loads imposed upon the parts are not great. In the accompanying drawing wherein similar characters are used to designate similar parts, I have shown my new and improved power transmitting mechanism utilized in a variable lubrication chart and applied to a pair of shafts on which is wound, in the manner described below, a continuous web bearing indicia relative to lubrication. In the drawing, Fig. 1 is a top view of the complete chart; Fig. 2 is a bottom view of the chart with the bottom removed; Fig. 3 is a section along the lines 3—3 in Fig. 1; Fig. 4 is a section along the lines 4—4 in Fig. 2; Fig. 5 is a detail of the power transmitting mechanism as shown in Figs. 1 to 4, inclusive; and Fig. 6 is a view similar to Fig. 5 of a modified form of mechanism.

Referring to the figures, the lubrication chart is no part of my invention. This chart, as shown, includes a casing 1 and a bottom 2. The upper face of the casing 1 has arranged thereon a fixed schedule, as at 3, of lubricating operations and, also, has a pad of sheets 4 upon which the operations are checked as completed. Arranged as at 5 is a slot underneath which a web 6 is passed, as explained below. The web 6 has on the upper face thereof a plurality of indicia, not shown, indicating the name of automobile and lubricating information to register with the columns or spaces of the schedule 3. Such information is given for each make and model of automobile and as the web 6 is passed below the slot 5 the given information may be selectively exposed.

The sheets 4 may be held in place by a bar 7 along one side edge and a spring clip 8 along the other side edge. As stated above, my invention is applied as a means for actuating the rollers 9 and 10 upon which the web 6 is mounted. The rollers 9 and 10 are mounted on shafts 11 and 12, respectively, and, so that the rollers may be easily removable, the ends of the shafts 11 and 12 are placed in the bosses 13 and 13ª and springs 14 are used to hold the opposite ends of the shafts in bosses 15 and 15ª.

Because of the varying diameters of the rollers 9 and 10 as the web 6 is moved backwards and forwards from one roll to the other, it is necessary that when the web is being wound on one roll the other roll will be free to rotate so that slack in the web will be taken up. To accomplish this the driving mechanism for the shafts 11 and 12 and, in turn, the rollers 9 and 10, comprises a driving shaft 16 supported by any suitable expedient, preferably, centrally between the driven shafts 11 and 12. A hand knob 17 is fixed to the outer end of the shaft 16 so that this shaft may be rotated in either direction. Fixed to the driven shaft 11 is a gear 18 and fixed to the driven shaft 12 is a similar gear 18ª. Freely rotatable on the shaft 16 is a pair of gears 19 and 20 and the gear 19 is in mesh with the gear 18 on the shaft 11 and the gear 20 is in mesh with the gear 18ª on the shaft 12. Splined to or otherwise rotatably fixed on the driving shaft 16 is a clutch member 21 which may slide longitudinally along the shaft.

Extending outwardly from the inner or adjacent faces of each of the gears 19 and 20 are a plurality of fingers 22. These fingers are inclined to the face of each gear and are arranged so that the axes of the fingers on one gear face are substantially parallel to the fingers on the other gear face. Similarly, extending from each opposed face of the clutch member 21 are similar fingers 23. The power transmitting mechanism as just described is shown in detail in Fig. 5.

The operation of this form of my power transmitting mechanism is as follows: When the driving shaft 16 is rotated in one direction the fingers 23 on one face of the clutch member 21 will meet and move into firm engagement under and with the fingers on one of the driving gears 19 or 20, depending upon the direction of the rotation of the shaft 16. When the shaft 16 is rotated in a reverse direction the clutch member 21, of course, will rotate therewith, but such rotation will cause the fingers in engagement to slide outwardly along each other and thereby to move the clutch member axially along the shaft 16 until the fingers on the opposite side of the clutch member 21 engage the fingers on the other driving gear. Of course, it should be understood, that the driving gears, the clutch member and the fingers must be spaced and arranged so that when one set of fingers on the clutch member is in engagement with a set of fingers on a driving gear the set of fingers on the opposite side of the clutch member will clear the ends of the fingers on the other driving gear. Also, the parts must be spaced and arranged so that as the clutch member is moved longitudinally of the shaft 16 by reverse rotation of the shaft the fingers in engagement will slide along one another because of such rotation and when the other set of fingers engage the fingers on the other driving gear continued movement of the clutch member will be effected as the newly engaged fingers slide into firm engagement. It will be seen that when one driving gear is being rotated by the shaft 16 the other driving gear will be free to rotate on the shaft.

In Fig. 6 I have shown a modified form of my invention in which the fingers 24 and 24ª carried on opposed faces of the clutch member 21ª and the fingers 25 and 25ª carried on adjacent faces of the driving gears 19ª and 20ª are somewhat arcuate in shape so that the sliding into and out of engagement is somewhat enhanced and so that a firm grip between the fingers is obtained in any position. The principle of operation of this embodiment is the same as that discussed above.

It should be understood that the size, shape and arrangement of the various parts of my mechanism may be varied within wide limits without departing from the spirit of my invention as included in the appended claims. For instance, the fingers may be formed with the parts carrying them or may be attached thereto. Similarly, the fingers may be formed by the teeth of under-cut gears. These and other changes may be made of necessity in adapting my mechanism to various uses.

What I claim as new and desire to secure by Letters Patent, is:

1. A power transmitting mechanism of the class described including a driving shaft, a pair of parts freely rotatable upon said driving shaft, said parts each having a plurality of fingers extending from adjacent faces thereof, the fingers on one part extending toward the fingers on the other part and said fingers having parallel axes, a clutch member rotatable with said driving shaft but slidable therealong and having a plurality of fingers extending outwardly from each opposed face thereof, and said parts, said clutch member and said fingers being relatively spaced and arranged whereby rotation of said driving shaft in one direction will cause the fingers on one face of said clutch member to engage the fingers on one of said parts whereby said part will be rotated by said driving shaft and rotation of said driving shaft in the other direction will cause the fingers on the other face of said clutch member to engage the fingers on the other of said parts whereby said other part will be rotated by said driving shaft.

2. A power transmitting mechanism of the class described including a clutch member, means for rotating said clutch member in reverse directions, a pair of parts associated with said clutch member and with one of said parts being positioned on each side thereof, said parts being rotatable relative to each other and each of said parts having a plurality of fingers extending from adjacent faces thereof, the fingers on one part extending toward the fingers of the other part and said fingers having parallel axes, said clutch member being formed and arranged so that the faces thereof adjacent said parts present an engaging surface to said fingers, and said parts, said clutch member and said fingers being relatively spaced and arranged whereby rotation of said clutch member in one direction will cause the fingers on one of said parts to engage the surface presented at one side of said clutch member whereby said part will be rotated, and rotation of said clutch member in the other direction will cause the fingers on the other of said parts to engage the surface presented at the adjacent side of said clutch member, whereby said other part will be rotated.

3. A power transmitting mechanism of the class described including a clutch member, said clutch member having a plurality of fingers extending from the faces thereof and having parallel axes, means for rotating said clutch member in reverse directions, a pair of parts associated with said clutch member and with one of said parts being positioned on each side thereof, said parts being rotatable relative to each other and each of said parts being formed and arranged so that the faces thereof adjacent said clutch member present an engaging surface to the fingers thereon, and said fingers being shaped and arranged and said parts and said clutch member being spaced relative to each other whereby rotation of said clutch member in one direction will cause the fingers on one face thereof to engage one of said parts so that said part may be rotated and rotation of said clutch member in the opposite direction will cause the fingers on the other face of said clutch member to engage the other of said parts so that said other part will be rotated.

4. A power transmitting mechanism of the class described including a clutch member having a plurality of fingers extending outwardly from each opposed face thereof, means for rotating said clutch member in reverse directions, a pair of parts associated with said clutch member and one of said parts being positioned on each side thereof, said parts being rotatable relative to each other and each of said parts having a plurality of fingers extending from the faces thereof adjacent the side faces of said clutch member, the fingers on one part extending toward the fingers on the other part and said fingers being shaped and arranged and said parts and said clutch member being spaced relative to each other whereby rotation of said clutch member in one direction will cause the fingers on one face thereof to engage the fingers of one of said parts so that said part will be rotated, and rotation of said clutch member in the opposite direction will cause the fingers on the other face of said clutch member to engage the fingers on the other of said parts so that said other part will be rotated.

5. A power transmitting mechanism of the class described including a clutch member having a plurality of fingers extending beyond the side faces thereof, means for rotating said clutch member in reverse directions, a pair of parts associated with said clutch member and one of said parts being positioned on each side thereof, said parts being rotatable relative to each other and each of said parts having a plurality of fingers extending beyond the faces of said parts adjacent the side faces of said clutch member and toward the fingers on said clutch member, said fingers on said clutch member and said parts having substantially parallel axes, and said fingers being shaped and arranged and said parts and said clutch member being spaced relative to each other whereby rotation of said clutch member in one direction will cause the fingers on one face thereof to engage the fingers on one of said parts so that said part will be rotated, and rotation of said clutch member in the opposite direction will cause the fingers on the other face of said clutch member to engage the fingers on the other of said parts so that said other part will be rotated.

6. A power transmitting mechanism of the class described including a driving shaft, a pair of parts freely rotatable upon said driving shaft and rotatable relative to each other, said parts each having a plurality of fingers extending beyond adjacent faces thereof, the fingers of one part extending toward the fingers of the other part and said fingers having parallel axes, a clutch member rotatable with said driving shaft and slidable therealong and being positioned between said parts, said clutch member having a plurality of fingers extending beyond the side faces thereof adjacent said parts, said fingers on said clutch member being arranged substantially parallel to the fingers carried by said parts, and said fingers being arranged on said clutch member and on said parts and said clutch member and said parts being spaced and arranged relative to each other whereby rotation of said driving shaft in one direction will cause the fingers on one face of said clutch member to engage the fingers on one of said parts so that said part will be rotated by said driving shaft in the direction of said clutch member, and rotation of said driving shaft in the opposite direction will cause the fingers on the other face of said clutch member to engage the fingers on the other of said parts so that said other part will be rotated by said driving shaft in the direction of said clutch member.

RAYMOND A. KALTWASSER.